US010153887B2

(12) United States Patent
Athalye et al.

(10) Patent No.: US 10,153,887 B2
(45) Date of Patent: *Dec. 11, 2018

(54) PATCH DOWNLOAD WITH IMPROVED ACKNOWLEDGE MECHANISM

(71) Applicant: INTEL IP CORPORATION, Santa Clara, CA (US)

(72) Inventors: Sachin V. Athalye, Singapore (SG); Venkatesh S. Obanaik, Singapore (SG); Geraint H. Ffoulkes-Jones, Daventry (GB); Anand Rangarajan, Singapore (SG); Jafer Hussain, Singapore (SG); Balaji S. Natakala, Bangalore (IN); Abdul Gafoor, Bangalore (IN)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/722,878

(22) Filed: Oct. 2, 2017

(65) Prior Publication Data
US 2018/0123764 A1    May 3, 2018

Related U.S. Application Data

(63) Continuation of application No. 14/751,009, filed on Jun. 25, 2015, now Pat. No. 9,780,938.

(51) Int. Cl.
*H04L 5/00*   (2006.01)
*G06F 9/445*  (2018.01)
(Continued)

(52) U.S. Cl.
CPC .............. *H04L 5/0055* (2013.01); *G06F 8/65* (2013.01); *H04L 1/12* (2013.01); *H04L 67/2833* (2013.01);
(Continued)

(58) Field of Classification Search
CPC ..... H04L 5/0055; H04L 1/12; H04L 67/2833; H04L 67/34; H04L 69/22; H04L 69/12
See application file for complete search history.

(56) References Cited

U.S. PATENT DOCUMENTS

2014/0372997 A1    12/2014 Furushige et al.

FOREIGN PATENT DOCUMENTS

WO    2013-100302 A1    7/2013

OTHER PUBLICATIONS

Office Action issued in U.S. Appl. No. 14/751,009, dated Apr. 5, 2017, 6 pages.
(Continued)

*Primary Examiner* — Gbemileke J Onamuti
(74) *Attorney, Agent, or Firm* — Grossman, Tucker, Perreault & Pfleger, PLLC

(57) ABSTRACT

Generally, this disclosure provides systems, devices, methods and computer readable media for patch downloading, from a host to a target, with improved acknowledge (ACK) mechanisms including combinations of out-of-sequence, single and aggregate acknowledge mechanisms. The method may include determining a packet size based on buffer capacity of the host; calculating the total number of packets (P) for transmission based on a size of the patch divided by the packet size; and calculating a packet storage capacity (N) of the target, based on buffer capacity of the target divided by the packet size. The method may also include transmitting the P packets to the target, including a sequence number and a portion of the patch, the transmission segmented into one or more cycles of up to N packets. The method may further include receiving ACKs from the target (asynchronously relative to the packet transmissions), the ACKS associated with the sequence numbers.

20 Claims, 12 Drawing Sheets

(51) Int. Cl.
  *H04L 29/08* (2006.01)
  *H04L 12/26* (2006.01)
  *H04L 29/06* (2006.01)
  *H04L 1/12* (2006.01)
  *G06F 8/65* (2018.01)
  *H04L 1/18* (2006.01)

(52) U.S. Cl.
  CPC .............. *H04L 67/34* (2013.01); *H04L 69/22* (2013.01); *H04L 1/1835* (2013.01)

(56) References Cited

OTHER PUBLICATIONS

Notice of Allowance issued in U.S. Appl. No. 14/751,009, dated Jun. 15, 2017, 9 pages.

300(b)

| Header Packet 302 | Sequence Number 0  306 |
| | Packet Size  314 |
| | Algorithm Type ID  308 |
| | Checksum  310 |
| | Component ID  312 |
| | Destination Address  315 |
| | Patch Content  316 |

| Subsequent Packets 304 | Sequence Number  306 |
| | Packet Size  314 |
| | Destination Address  315 |
| | Patch Content  316 |

FIG. 3(b)

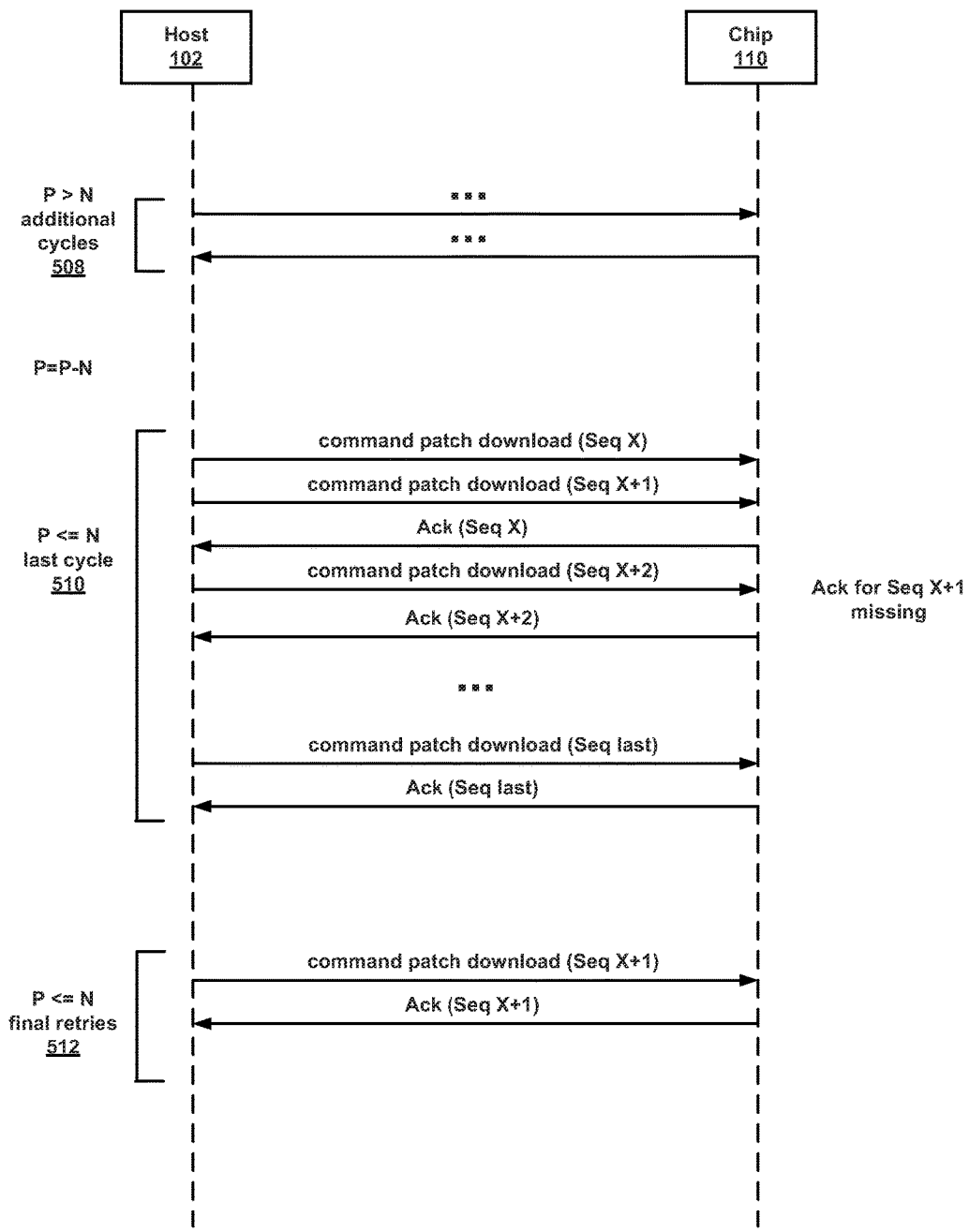
FIG. 5 (con't)

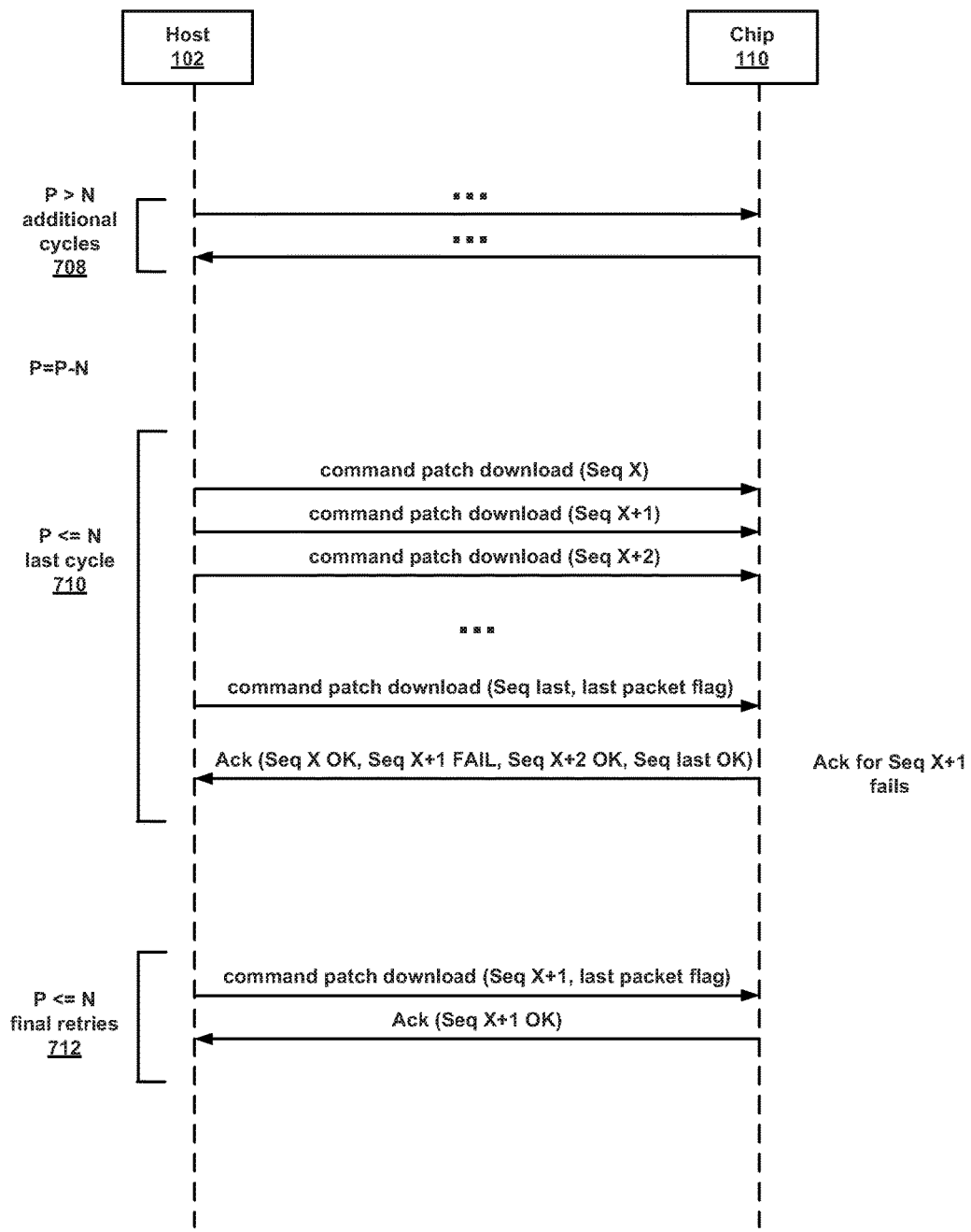
FIG. 7 (con't)

PATCH DOWNLOAD WITH IMPROVED ACKNOWLEDGE MECHANISM

CROSS-REFERENCE TO RELATED APPLICATION

The present application is a continuation of U.S. patent application Ser. No. 14/751,009 filed Jun. 25, 2015, the entire disclosure of which is incorporated herein by reference.

FIELD

The present disclosure relates to patch downloading, and more particularly, to patch downloading with improved acknowledge mechanisms including combinations of out-of-sequence, single and aggregate acknowledge mechanisms.

BACKGROUND

System host platforms, for example, computing and communication platforms, may include multiple sub-systems or chips. These subsystems may include read only memory (e.g., ROM-based chips) to store software, firmware, factory settings, etc., associated with the operation of that subsystem. Occasionally, updates to the ROM contents are required, for example to apply patches to the software or firmware to provide bug fixes or new features, or to adjust parameters. Patch downloads may be applied by the host to the chips as part of the boot up process for the chips. Typically, the host sends commands to the chip via some physical transport mechanism, where each command is associated with a packet of download patch content.

Some host systems perform the patch download without using any type of acknowledgment mechanism. These systems expect that the patch packets will not encounter any errors during the download. The physical transport, however, may be noisy, particularly if the host and the chip are manufactured by different vendors. Thus, in the event of an error, the entire patch download process must be restarted, which may result in an unacceptable delay.

Other host systems may employ an acknowledgment mechanism where the host sends a command to the chip and then waits for the acknowledge signal (ACK) from the chip, indicating success for that command/packet. This unfortunately creates a bottleneck since further packet downloads may be held up until the ACK is received. Here again, in the event of an error, the entire patch download may need to be repeated.

Still other systems may employ a Transfer Control Protocol (TCP) style ACK mechanism. Under this scheme, the ACK is sent only in case of failure. However, if the ACK is lost, for example under noisy conditions, the host and the chip may lose synchronization which may result in the chip operating with an incorrect patch or not operating correctly at all.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIGS. 3(a) and 3(b) illustrates packet formats of one example embodiment consistent with the present disclosure;

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for patch downloading from a host to a target with improved acknowledge (ACK) mechanisms including combinations of out-of-sequence, single and aggregate acknowledge mechanisms. The patches may include, for example, software, firmware, manufacturer settings and data. In some embodiments, the host may be a system platform and the target(s) may be one or more ROM based chips or sub-systems of the platform. The host may be configured to incorporate information associated with the target chip buffer capacity to select download packet size and data transfer rates for improved efficiency while avoiding buffer overflows. The download process may thus scale to utilize available bandwidth over the physical interface between host and target.

ACKs may be received from the targets and processed asynchronously, with respect to packet transmission, to avoid blocking. The term "asynchronous," as used herein in connection with transmission acknowledgements, refers to the operation of transmitting packets without waiting to receive ACKs in response to previous packet transmissions. Packets may also be downloaded out of sequence. Lost or corrupted packets may subsequently be detected and selectively re-transmitted to the target without requiring re-download of the entire patch. The integrity of the downloaded patch may be maintained through use of a patch checksum (or other data integrity checking mechanism including a cyclic redundancy check (CRC) or parity bits). The download process may be dynamically switched between single and aggregate ACK mode, as will be described in detail below, based on measured performance associated with current and/or previous modes.

It will be appreciated that more efficient patch downloading, in accordance with embodiments of the present disclosure, may be particularly useful during the development stages of embedded system integration, when various target hardware components are being debugged and may require more frequent patching as part of the development process. The techniques disclosed herein may thus be employed to reduce time to market.

Figure 1:
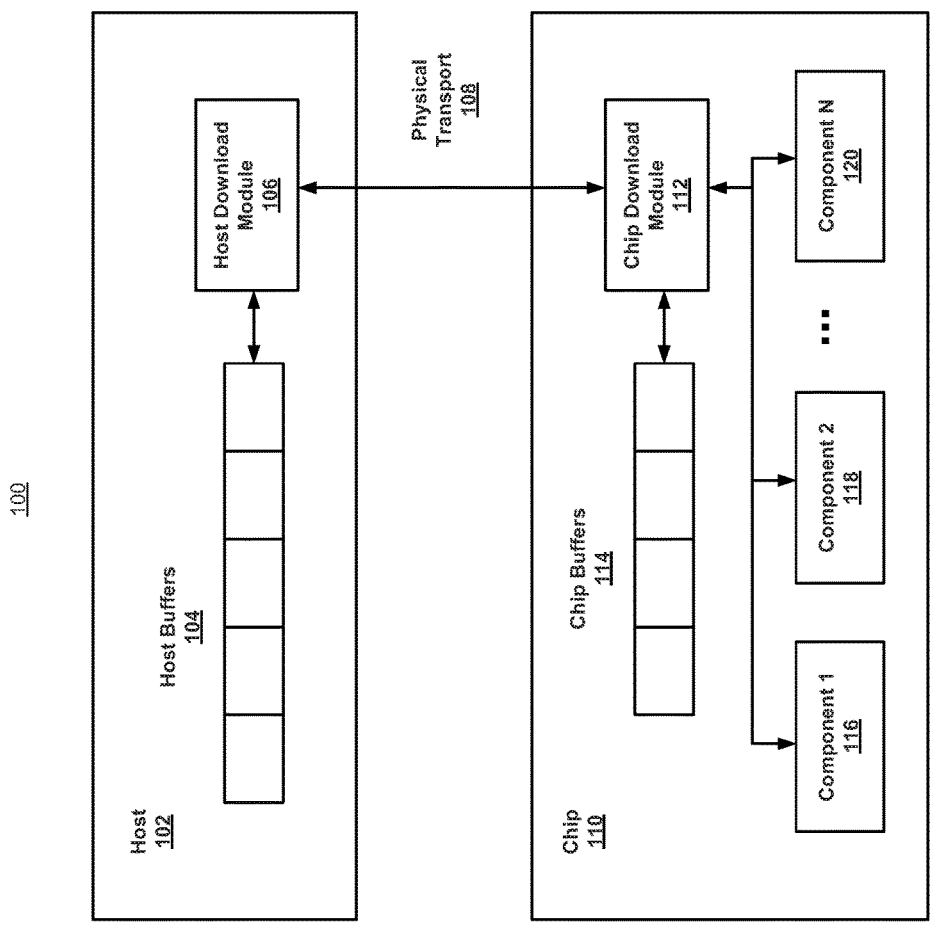
FIG. 1 illustrates a top level system diagram of an example embodiment consistent with the present disclosure.

FIG. 1 illustrates a top level system diagram 100 of one example embodiment consistent with the present disclosure.

A host system or platform 102 is shown to include a host download module 106 and host buffers 104. The host buffers 104 may be configured to store the patch download, or portions thereof, for packetization and transmission to the target chip 110 by the host download module 106, as described below. In some embodiments, the host 102 may be, for example a computing or communication platform. A target Chip 110 is shown to include chip download module 112 and chip buffers 114. Chip buffers 114 may be configured to receive and store packets of the patch download that are received and managed by the chip download module 112, as described below. In some embodiments, the chip 110 may be, for example, a transceiver, a network interface or a Global Navigation Satellite System (GNSS). The chip 110 may further include one or more components or subcomponents 116, 118, ... 120, any of which may be configured to install a patch download from the chip download module 112.

A physical transport mechanism 108 may be configured to provide communication between the host 102 and the chip 110. The transport mechanism 108 may not necessarily provide error free communication. Communications may include download patch packets (e.g., transmitted from host to chip) and acknowledgments (e.g., transmitted from chip to host). In some embodiments, the physical transport 108 may be, for example, a Universal Asynchronous Receiver/Transmitter (UART), a Serial Peripheral Interface (SPI), a Universal Serial Bus (USB) or an Inter-Integrated Circuit bus (I2C). Of course, any other suitable physical transport, existing or yet to be developed, may also be employed. In some embodiments, multiple physical transports 108 may be provided, for example, one transport for packet communication and a second transport for acknowledgments. In some embodiments, packets may be transmitted from the host over multiple physical transports (for example, in parallel) and aggregated on the chip side to achieve greater throughput than might otherwise be possible using a single physical transport. In some embodiments, the multiple physical transports may be configured to download patches for multiple components 116, 118, ... 120 of the chip in parallel.

Figure 2:
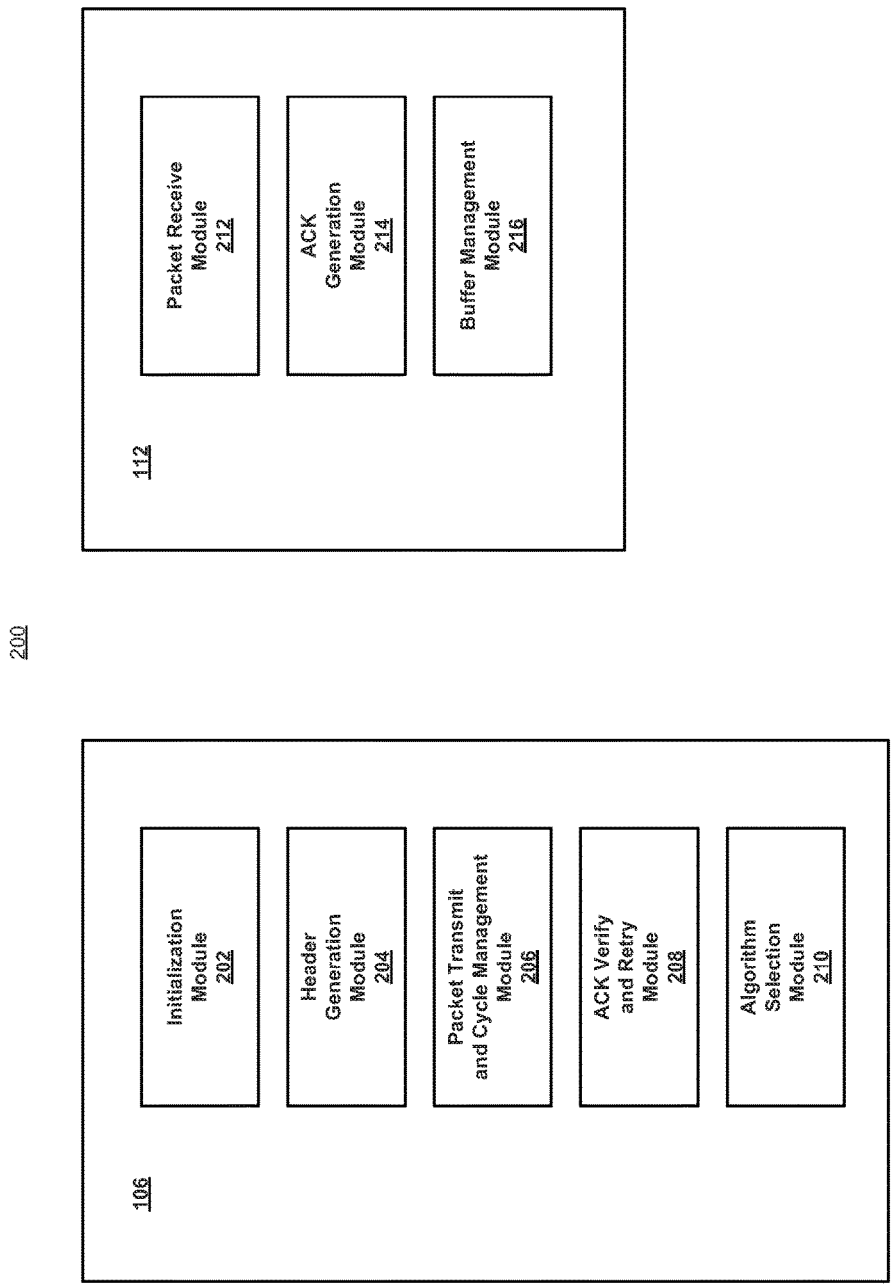
FIG. 2 illustrates a block diagram of one example embodiment consistent with the present disclosure.

FIG. 2 illustrates a block diagram 200 of one example embodiment consistent with the present disclosure. The host download module 106 is shown to include an initialization module 202, a header generation module 204, a packet transmit and cycle management module 206, an ACK verify and retry module 208 and an algorithm selection module 210. The chip download module 112 is shown to include a packet receive module 212, an ACK generation module 214, and a buffer management module 216. The operations of these modules will be explained in greater detail below in connection with the descriptions of the processes and message flows.

Figure 3A:
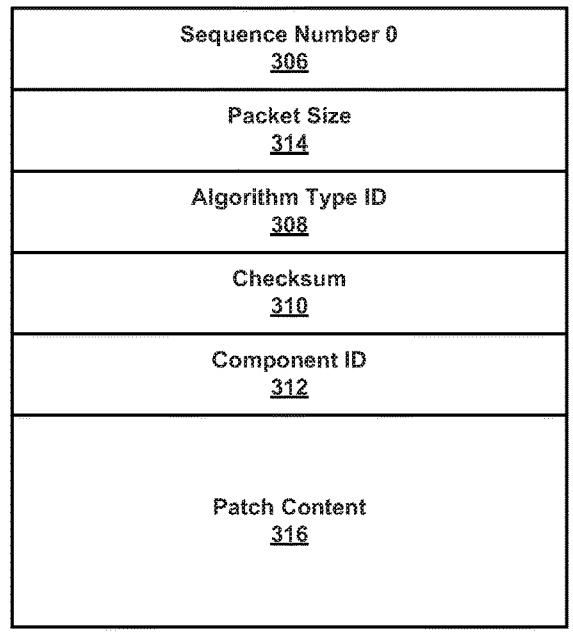

FIG. 3(a) illustrates a packet format 300a of one example embodiment consistent with the present disclosure. A header packet 302 is shown to include a sequence number field 306, containing for example the sequence number zero to indicate that it is a header packet, an algorithm type ID 308, a checksum 310, a component ID 312, a packet size 314 and patch content 316. Non-header packets 304 (for example, packets transmitted subsequent to the header packet) are shown to include the sequence number field 306, and patch content 316. The packet fields will be described in greater detail below. Of course, in some embodiments, packets may include other fields containing any additional information that may be suitable for a particular application. Additionally, it will be appreciated that the ordering of these fields within the packet is presented as one possible example and may be changed in other embodiments.

The patch download process to be described herein may be performed repeatedly by the host 102 on each of possibly multiple components 116, 118, 120 of each of possibly multiple chips 110. In some embodiments, multiple physical transports may be configured to enable the download process to be performed in parallel on each of the multiple possible components. The procedure may be the same in each instance. The host initialization module 202 may be configured to begin operations by powering up the chip 110 and setting the baud rate (e.g., data transfer rate) of the physical transport 108. The baud rate may be set to either a maximum value or a lower value that is associated with a desired lower error rate (or possibly an error free rate). Continuing the initialization phase, the initialization module 202 may then query the chip 110 to determine the number of chip buffers 114 available as well as their size. The total available chip buffer space is the product of these two quantities and will be used to avoid causing buffer overruns in the chip.

The patch download may be distributed over a number of packets, each of size p bytes, where the size p is based on the number of host buffers 104 and characteristics of the physical transport, such as, for example, the number of bytes that can be reliably communicated between the host and the chip in one packet. In some embodiments, values for p may range from 128, 512, 1024, 2048 bytes or more depending on the speed of communication (or baud rate) between host and chip. In some embodiments, the size p may be limited to a maximum threshold value that may be less than the size that the chip might accommodate based on its available buffers. In some embodiments, the maximum value may be, for example, 2 Kbytes. The host initialization module 202 may be further configured to then calculate the number of packets to be sent (P) equal to the total patch size divided by p (e.g., P=total patch size/p). The number of packets that the chip can store (N) may also be calculated as equal to the total size of the chip buffers divided by p (e.g., N=total size of chip buffers/p). Thus, if P is greater than N, there will be multiple cycles (as described below), each cycle of N packets, and a final cycle of remaining packets. If P is less than or equal to N, then there will be just one cycle of P packets.

The packet with the first sequence number to be downloaded is the header packet 302. Header generation module 204 may be configured to generate the header packet containing fields illustrated in FIG. 3. In particular, the sequence number field 306 may be set to zero for the header packet, as a way to indicate to the chip that this packet is a header packet, although any suitable value, which is mutually agreed upon between host and chip, may be used for this purpose. The algorithm type ID field 308 may be set to indicate that operations are to be in single ACK mode or aggregate ACK mode, as explained below. The checksum field 310 may be used to verify the validity of the entire download patch as received by the chip. This may provide some form of guarantee of successful patch download. The component ID field 312 may be used to identify a particular component in the chip to which this patch download is to be targeted. The packet size field 314 informs the chip of the size (p) of the packets that will be transmitted, so that the chip may properly receive and store the packets in chip buffer memory 114. The patch content field 316 contains a first portion of the patch download content to utilize the remaining space in the header packet. In some embodiments, the header generation module 204 may be configured to perform the operations of the initialization module 202 described previously and/or the header generation module 204 may include the initialization module 202.

Because the information provided in the header packet is needed by the chip in order to perform the download properly, the host will wait for an ACK from the chip to indicate that the header packet was received successfully before proceeding. The header packet could therefore be the only packet transmission for which the host may be blocked, waiting for an ACK. In the case of an error (e.g., no ACK received), the host may retry the header packet transmission up to some predetermined number of times (e.g., 3 times). If the error persists, the host may reset the chip.

Figure 3A:
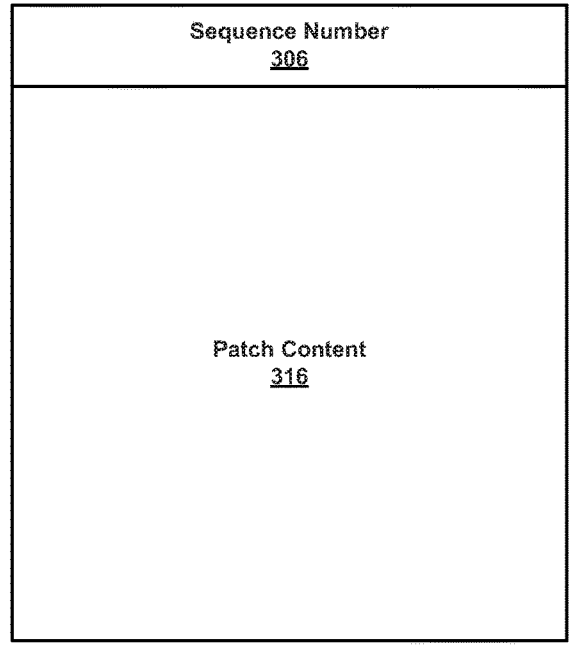

Packet transmit and cycle management module 206 may be configured to transmit subsequent packets 304 in one or more cycles, where each cycle (except for possibly the last cycle) includes N packets. These subsequent packets 304 are shown in FIG. 3 to include a sequence number 306 and patch download content 316. The packets maybe transmitted out of sequence since the chip is configured to reassemble them in the proper order based on the sequence number.

At the start of the cycle, if P>N then the cycle will include N packets, which will be transmitted from the host to the chip without waiting for an ACK. The chip packet receive module 212 may be configured to receive the packets. The chip buffer management module 216 may be configured to write each packet into chip buffer memory 114 based on the sequence number within the packet. When operating in single ACK mode, the ACK generation module 214 may be configured to generate an ACK for every received packet, with a sequence number to match that received packet. When operating in aggregate ACK mode, the ACK generation module 214 may be configured to generate an aggregate ACK after receiving a maximum of N/2 packets. The aggregate ACK includes a sequence number and a fail/success indicator for each of the N/2 packets. The aggregate ACK may also provide the number of free buffers available within the chip for further processing, with a default value of N/2.

After N packets are transmitted, and all the chip buffers are consumed, the host prepares for the next cycle. The ACK verify and retry module 208 may be configured to check the ACKs that were received. If no ACK was received (or if received after a timeout), or if any ACK was received in error, the ACK verify and retry module 208 may retransmit the erroneous packets on the next cycle (depending on the number of errors). The retry packets may be transmitted with the same priority as original transmission packets. If all ACKs were received, then the new cycle may be started with all new packets. The number of new packets may also depend on the available host buffers. P will be decreased by N, and if P>N, the cycle will be repeated as described above for another N packets.

If P is less than or equal to N, however, a last cycle will be performed for just the remaining P packets, which will be transmitted from the host to the chip as before without waiting for an ACK. When operating in single ACK mode, the ACK generation module 214 may be configured to generate an ACK for every received packet as before. When operating in aggregate ACK mode, however, the host may be configured to transmit a "last packet" flag to signal the chip to respond with an aggregate ACK.

After all P packets are transmitted, the ACK verify and retry module 208 may check the ACKs that were received. If all ACKs were received, then the current patch download was successful and the host may move on to the next component or chip. If no ACK was received (or if received after a timeout), or if any ACK was received indicating an error, the ACK verify and retry module 208 may retry or retransmit the erroneous packets (depending on the number of errors). The retry packets may be transmitted with the same priority as original transmission packets. When operating in aggregate ACK mode, the host may transmit another "last packet" flag to trigger another aggregate ACK from the chip to determine if the retransmits were successful. In the event of repeated errors during re-transmission, the host may retry up to some predetermined number of times (e.g., 3 times). If the error persists, the host may reset the chip. In some embodiments, if the error persists, smaller packet sizes may be attempted (e.g., p/2, p/4, p/10, etc.) before resorting to chip reset.

After a successful patch download (including a patch checksum verification), the host may issue a soft reset to the chip enabling the patch to be applied.

In some embodiments, the algorithm selection module 210 may be configured to dynamically select whether the single ACK algorithm or the aggregate ACK algorithm, or a combination of the two, will be used. A number of options are possible. A first option is a static approach, using the single ACK algorithm for all patch file downloads. A second option is a static approach, using the aggregate ACK algorithm for all patch file downloads.

A third option is a dynamic approach, referred to as "coarse speed" on a per file basis. In this approach, the host selects one type of algorithm (single ACK or aggregate ACK) for the first patch file download and the other type of algorithm for the second patch file download. The host then computes the ratio of patch file size to download time for both cases as an indicator of the speed of the download for each algorithm type. For all subsequent download files, the host selects the algorithm which had the highest ratio, resulting in the most efficient patch downloading for those files.

A fourth option is a dynamic approach, referred to as "fine speed" on a per file basis. In this approach, the host again selects one type of algorithm for the first patch file download and the other type of algorithm for the second patch file download. The host again computes the ratio of patch file size to download time for both cases, which will be referred to as Speed1 and Speed2, respectively. For the next file download, if Speed1>=Speed2, then the first algorithm type will be used, otherwise the second algorithm type will be used, after which a new speed will be computed for that file download. Speed1 and Speed2 will then be updated to reflect the average speed for all patch file downloads performed to that point using the first algorithm type and the second algorithm type, respectively. The process is then repeated for each of the next and subsequent file downloads.

FIG. 3(*b*) illustrates a packet format 300*b* of another example embodiment consistent with the present disclosure. In some embodiments, a variable packet size may be employed so that, for example, the packet size may be dynamically adjusted in response to variations in the quality of the communications provided by the physical transport. For example, if the error rate increases, packets with an initial size of 2K bytes may fail to get through without errors, while a smaller packet of, for example 128 bytes, may be more likely to be successfully transmitted. In this embodiment, the packet header 302 and subsequent packets 304, may include a destination address field 315 configured to provide a destination address for the packet within the chip buffers 114. The destination address field 315 (along with the sequence number 306 and packet size 314) may assist the chip buffer management module 216 in the management of received packets of varying size. Of course, as mentioned previously, packets may include other fields containing any additional information that may be suitable for a particular application and the ordering of these fields within the packet may be varied in other embodiments.

Additionally, in some embodiments, the destination address field 315 may also be included in the packet format 300a of FIG. 3(a) to provide an alternative mechanism for the chip buffer management module 216 to manage packet storage destinations even though the packet size may be fixed.

Figure 4:
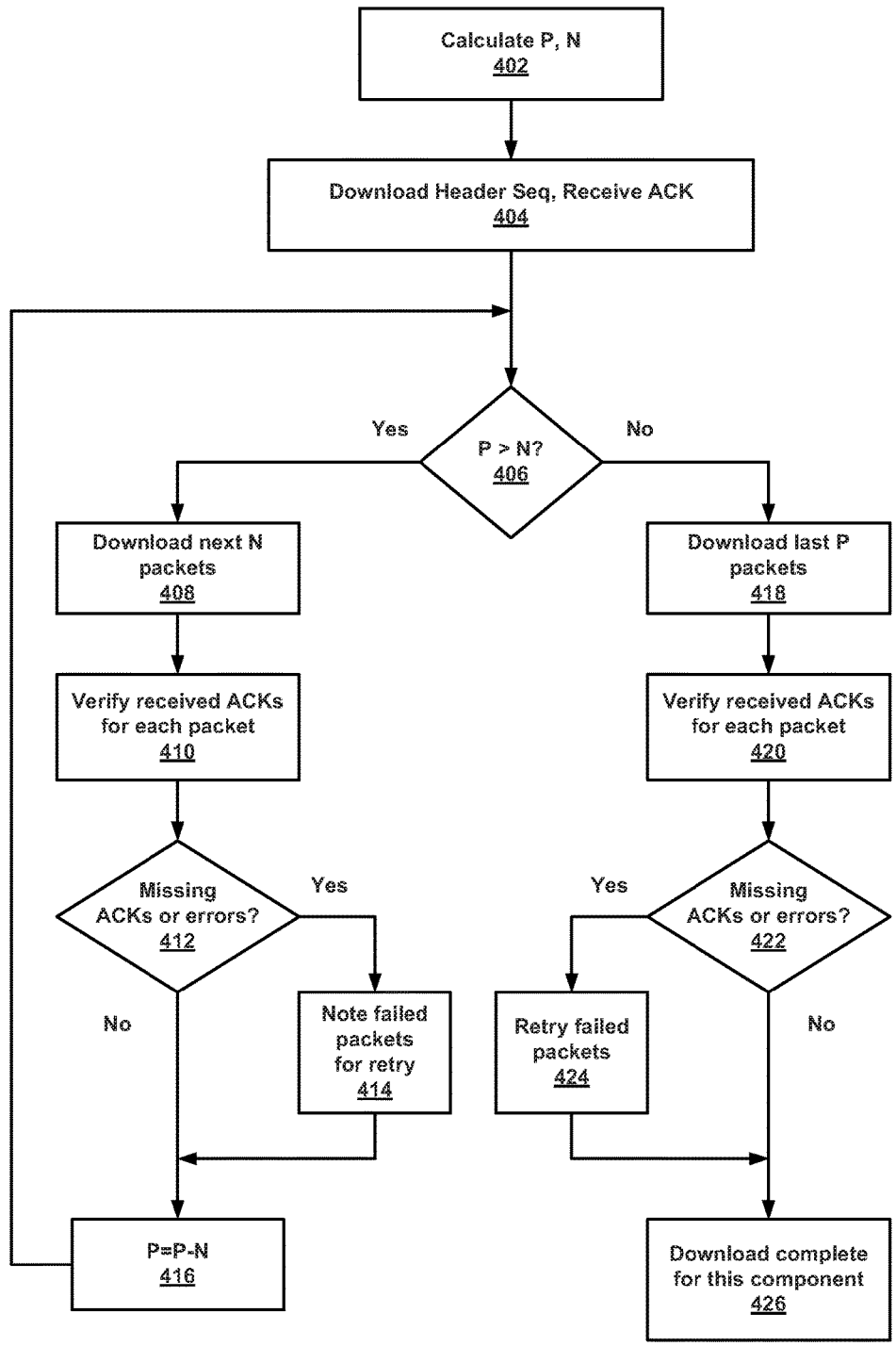
FIG. 4 illustrates a flowchart of operations of one example embodiment consistent with the present disclosure.

FIG. 4 illustrates a flowchart of operations 400 of one example embodiment consistent with the present disclosure. The patch download process for a component of the chip may proceed as follows under the single ACK mode of operation. At operation 402, P and N are calculated. At operation 404, the header sequence is downloaded and an ACK is received. At operation 406, P is compared to N.

If P is greater than N, then at operation 408, the first (or next) set of N packets are downloaded. At operation 410, it is verified that ACKs are received for each packet. At operation 412, it is determined if there are any missing ACKs or errors in transmission. If so, then at operation 414, the failed packets are noted for attempted retransmission at operations 408 or 418 of the next cycle. At operation 416, P is updated such that P=P−N for the next cycle.

Continuing, from operation 406, if P is not greater than N, then at operation 418, the remaining P packets are downloaded. At operation 420, it is verified that ACKs are received for each packet. At operation 422, it is determined if there are any missing ACKs or errors in transmission. If so, then at operation 424, the failed packets are attempted to be retransmitted.

At operation 426, the download is complete and the process may be repeated for another component of the chip or another chip.

Figure 5:
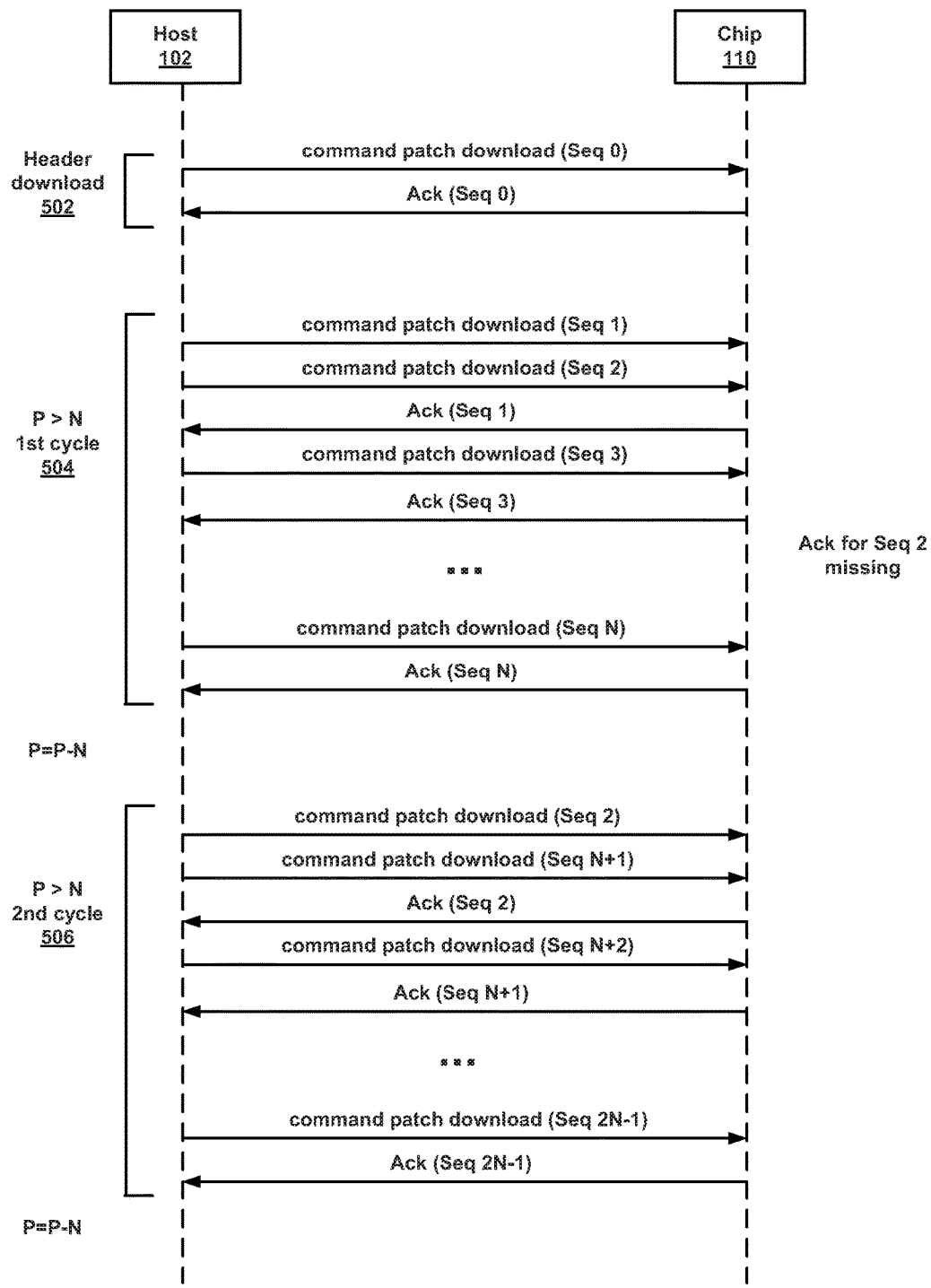
FIG. 5 illustrates a message flow example of another embodiment consistent with the present disclosure.

FIG. 5 illustrates a message flow example 500 of another embodiment consistent with the present disclosure. In this example, a message flow associated with the single ACK mode of operation is shown. The message flow begins with the header download 502 from the host 102 to the chip 110. The header packet is transmitted as a patch download command with a sequence number of zero (or any suitable sequence number agreed upon by host and chip to indicate that this is the first packet). For the header transmission, the host waits for an ACK packet associated with sequence number zero, indicating that the chip received the header without error and has obtained the information needed for subsequent download operations.

A first transmit cycle 504 is then performed while P is greater than N. In this cycle, patch download commands are issued to transmit packets with sequence numbers 1 through N. In this example, ACKs are received for all packets 1 through N with the exception of the packet with sequence number 2, for which the ACK is missing. At the completion of the cycle, P is reduced by N (e.g., P=P−N).

A second transmit cycle 506 is then performed while P remains greater than N. In this cycle, patch download commands are issued to re-transmit packet 2 and to transmit packets with sequence numbers N+1 through 2N−1 (since each cycle transmits N packets, if the cycle starts with N+1 and there is 1 retry, the cycle will end with 2N−1). This time ACKs are received for all transmitted packets. At the completion of the cycle, P is again reduced by N (e.g., P=P−N).

Additional transmit cycles 508 are performed while P remains greater than N and at the end of each cycle P is again reduced by N (e.g., P=P−N).

Eventually, P becomes less than or equal to N and the last cycle 510 is performed. In this cycle, patch download commands are issued to transmit packets with sequence numbers X through the last sequence number. The last sequence number would typically be the original value of P minus 1, assuming the first sequence number was zero and sequence numbers incremented sequentially, although this is not required. In this example, ACKs are received for all packets X through the last sequence number with the exception of the packet with sequence number X+1, for which the ACK is missing. Because there is an outstanding ACK that was not received, a final retry cycle 512 is performed in which a patch download command is issued to re-transmit the packet with sequence numbers X+1. In this example, the ACK for sequence X+1 is received after the retry.

Figure 6:
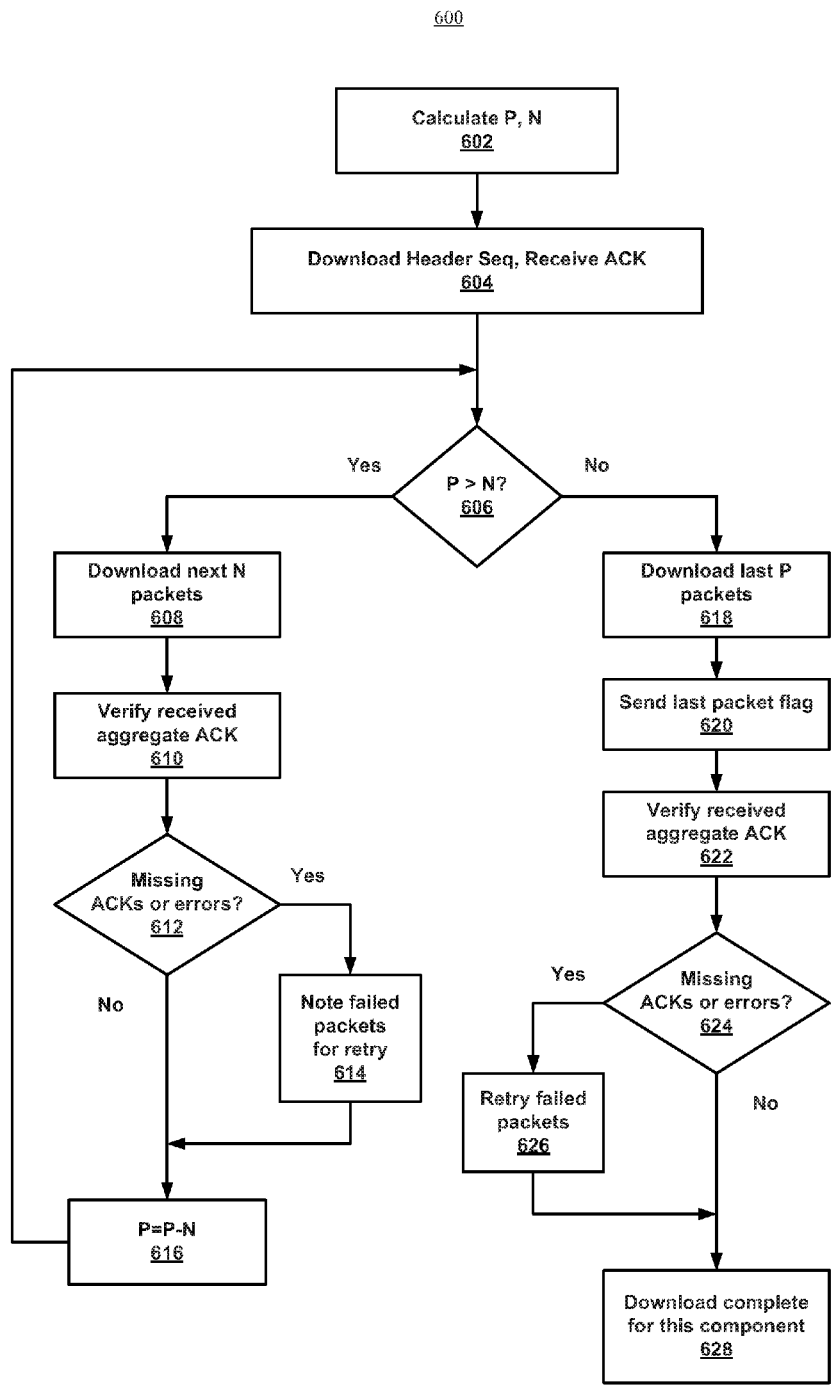
FIG. 6 illustrates a flowchart of operations of another example embodiment consistent with the present disclosure.

FIG. 6 illustrates a flowchart of operations 600 of another example embodiment consistent with the present disclosure. The patch download process for a component of the chip may proceed as follows under the aggregate ACK mode of operation. At operation 602, P and N are calculated. At operation 604, the header sequence is downloaded and an ACK is received. At operation 606, P is compared to N.

If P is greater than N, then at operation 608, the first (or next) set of N packets are downloaded. At operation 610, it is verified that ACKs are received for each packet in aggregate. At operation 612, it is determined if there are any missing ACKs or errors in transmission. If so, then at operation 614, the failed packets are noted for attempted retransmission at operations 608 or 618 of the next cycle. At operation 616, P is updated such that P=P−N for the next cycle.

Continuing, from operation 606, if P is not greater than N, then at operation 618, the remaining P packets are downloaded. At operation 620, a "last packet" flag is sent to the chip. At operation 622, it is verified that ACKs are received for each packet in aggregate. At operation 624, it is determined if there are any missing ACKs or errors in transmission. If so, then at operation 626, the failed packets are attempted to be retransmitted.

At operation 628, the download is complete and the process may be repeated for another component of the chip or another chip.

Figure 7:
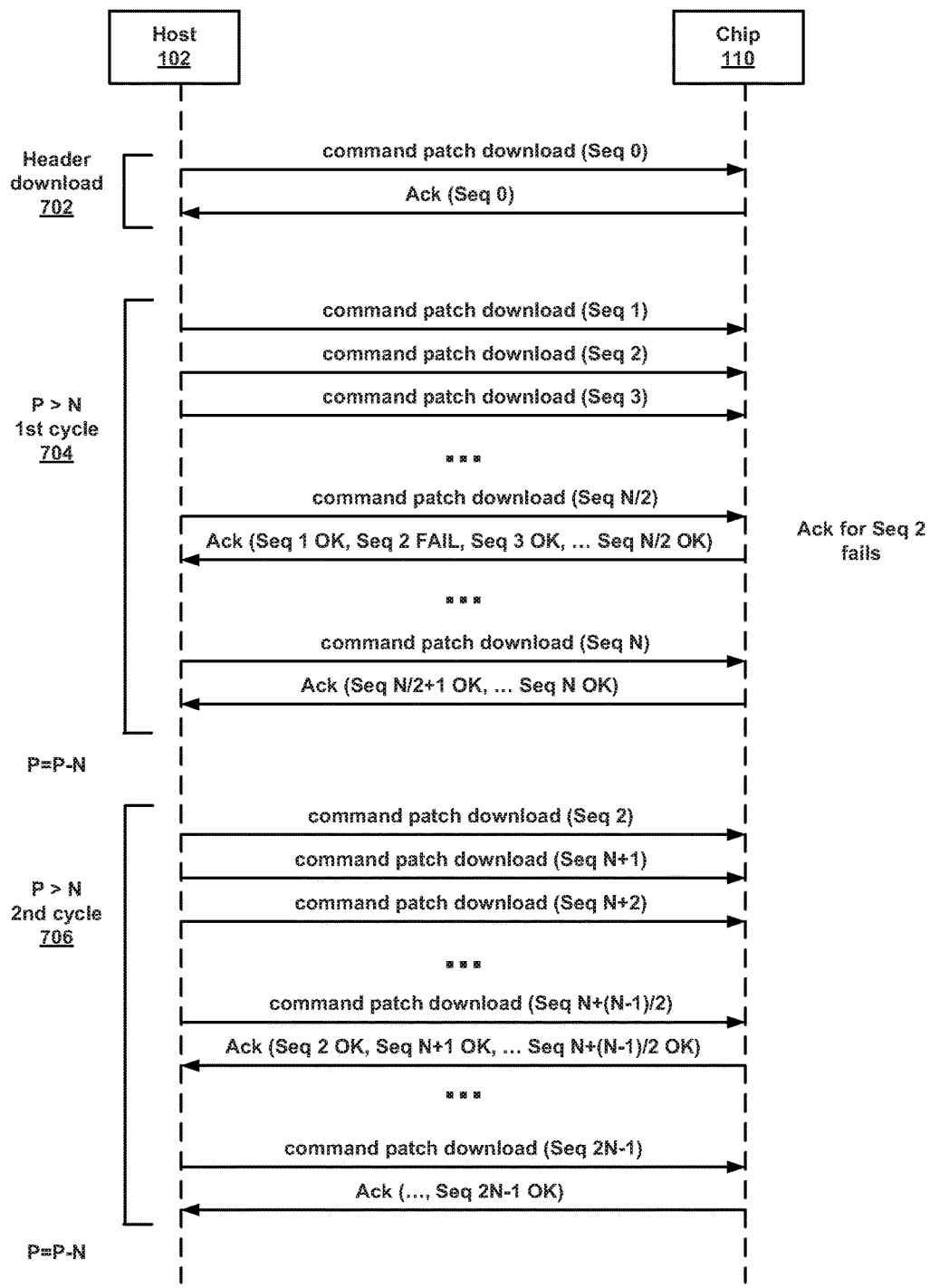
FIG. 7 illustrates a message flow example of another embodiment consistent with the present disclosure.

FIG. 7 illustrates a message flow example 700 of another embodiment consistent with the present disclosure. In this example, a message flow associated with the aggregate ACK mode of operation is shown. The message flow begins with the header download 702 from the host 102 to the chip 110. The header packet is transmitted as a patch download command with a sequence number of zero (or any suitable sequence number agreed upon by host and chip to indicate that this is the first packet). For the header transmission, the host waits for an ACK packet associated with sequence number zero, indicating that the chip received the header without error and has obtained the information needed for subsequent download operations.

A first transmit cycle 704 is then performed while P is greater than N. In this cycle, patch download commands are issued to transmit packets with sequence numbers 1 through N. The chip replies with an aggregate ACK after receiving a maximum of N/2 packets. The aggregate ACK includes the sequence number of each received packet along with a success/fail indicator for that packet. The aggregate ACK also includes the number of free buffers available within the chip for further processing (with a default value of N/2). In this example, the aggregate ACK indicates that all of packets 1 through N/2 are received successfully with the exception of the packet with sequence number 2. The remaining packets (N/2+1 through N) are downloaded and a subsequent aggregate ACK indicate successful receipt. At the completion of the cycle, P is reduced by N (e.g., P=P−N).

A second transmit cycle 706 is then performed while P remains greater than N. In this cycle, patch download commands are issued to re-transmit packet 2 and to transmit the next N/2 packets (with sequence numbers N+1 through N+(N−1)/2). This time the aggregate ACK is received to indicate success for all transmitted packets. The remaining packets through 2N−1 are downloaded and a subsequent aggregate ACK indicate successful receipt. At the completion of the cycle, P is again reduced by N (e.g., P=P−N).

Additional transmit cycles 708 are performed while P remains greater than N and at the end of each cycle P is again reduced by N (e.g., P=P−N).

Eventually, P becomes less than or equal to N and the last cycle 710 is performed. In this cycle, patch download commands are issued to transmit packets with sequence numbers X through the last sequence number. The last sequence number would typically be the original value of P minus 1, assuming the first sequence number was zero and sequence numbers incremented sequentially, although this is not required as any sequence numbering scheme (agreed upon by host and chip) may, in general, be used. A last packet flag is also transmitted to trigger the chip to send an aggregate ACK. In this example, an aggregate ACK is then received indicating success for all packets with the exception of the packet with sequence number X+1. Because the aggregate ACK indicated a failure, a final retry cycle 712 is performed in which a patch download command is issued to re-transmit the packet with sequence numbers X+1. In this example, the ACK for sequence X+1 is received after the retry.

Figure 8:
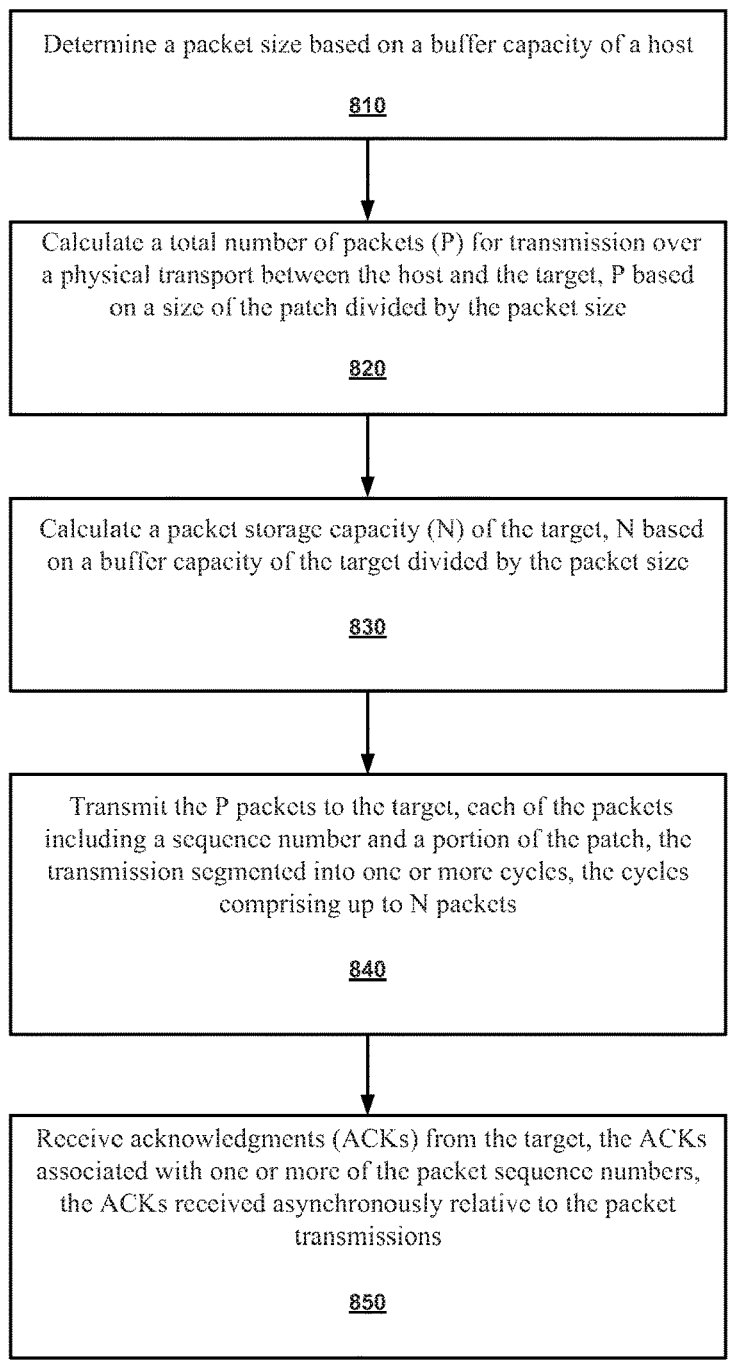
FIG. 8 illustrates a flowchart of operations of another example embodiment consistent with the present disclosure.

FIG. 8 illustrates a flowchart of operations 800 of another example embodiment consistent with the present disclosure. The operations provide a method for patch downloading with improved acknowledge (ACK) mechanisms. At operation 810, a packet size is determined based on a buffer capacity of the host. At operation 820, a total number of packets (P) is calculated for transmission over a physical transport between the host and the target. P is based on a size of the patch divided by the packet size. At operation 830, a packet storage capacity (N) of the target is calculated. The packet storage capacity is based on a buffer capacity of the target divided by the packet size. At operation 840, the P packets are transmitted to the target. Each of the packets includes a sequence number and a portion of the patch. The transmission is segmented into one or more cycles. Each of the cycles include up to N packets. At operation 850, acknowledgments (ACKs) are received from the target. The ACKs are associated with one or more of the packet sequence numbers and are received asynchronously relative to the packet transmissions.

Figure 9:
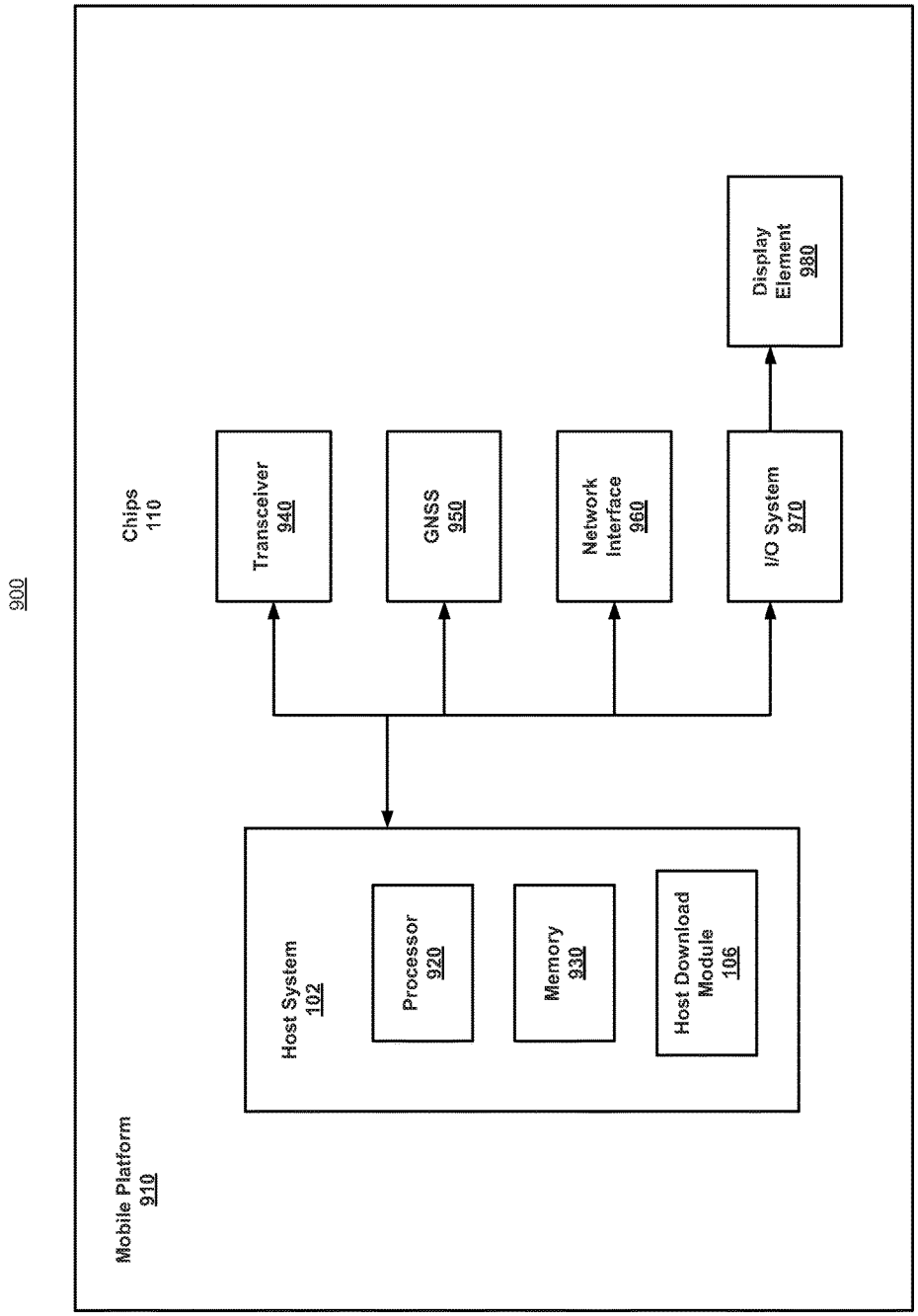
FIG. 9 illustrates a system diagram of a platform of another example embodiment consistent with the present disclosure.

FIG. 9 illustrates a system diagram 900 of one example embodiment consistent with the present disclosure. The system 900 may be a mobile platform 910 or computing device such as, for example, a smart phone, smart tablet, personal digital assistant (PDA), mobile Internet device (MID), convertible tablet, notebook or laptop computer, or any other suitable device. It will be appreciated, however, that embodiments of the system described herein are not limited to mobile platforms, and in some embodiments, the system 900 may be a workstation or desktop computer. The device may generally present various interfaces to a user via a display element 980 such as, for example, a touch screen, liquid crystal display (LCD) or any other suitable display type.

The system 900 is shown to include a host system 102 that may further include any number of processors 920, memory 930 and host download module 106 (the operations of which have been described previously). In some embodiments, the processors 920 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. The memory 930 may be coupled to the processors and may include host buffers 104 as described previously. The memory 930 may be any of a wide variety of memories (including various layers of memory hierarchy and/or memory caches) as are known or otherwise available to those of skill in the art. It will be appreciated that the processors and memory may be configured to store, host and/or execute one or more user applications or other software modules. These applications may include, but not be limited to, for example, any type of computation, communication, data management, data storage and/or user interface task. In some embodiments, these applications may employ or interact with any other components of the mobile platform 910.

System 900 is also shown to include a number of example of chips 110 including a transceiver 940, a GNSS module 950 and a network interface module 960 which may include wireless communication capabilities, such as, for example, cellular communications, Wireless Fidelity (WiFi), Bluetooth®, Near Field Communication (NFC) and/or any other communications technology, existing or yet to be developed. The wireless communications may conform to or otherwise be compatible with any existing or yet to be developed communication standards including past, current and future version of Bluetooth®, Wi-Fi and mobile phone communication standards.

System 900 is also shown to include an input/output (IO) system or controller 970 which may be configured to enable or manage data communication between processor 920 and other elements of system 900 or other elements (not shown) external to system 900.

It will be appreciated that in some embodiments, the various components of the system 900 may be combined in a system-on-a-chip (SoC) architecture. In some embodiments, the components may be hardware components, firmware components, software components or any suitable combination of hardware, firmware or software.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as, for example, processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hard-wired circuitry, programmable circuitry, state machine circuitry, and/or firmware that stores instructions executed by programmable circuitry. An application (or "app") may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip. In some embodiments, a module may thus be implemented in software and/or firmware and may comprise one or more processes, threads or subroutines of a single process. Additionally, in some embodiments, a module may be distributed and executed on separate devices.

Thus, the present disclosure provides systems, devices, methods and computer readable media for patch downloading with improved acknowledge mechanisms including combinations of out-of-sequence, single and aggregate acknowledge mechanisms. The following examples pertain to further embodiments.

According to Example 1 there is provided a system for downloading a patch from a host to a target. The system may include a header generation module to: determine a packet size based on a buffer capacity of the host; calculate a total number of packets (P) for transmission over a physical transport between the host and the target, P based on a size of the patch divided by the packet size; and calculate a packet storage capacity (N) of the target, N based on a capacity of a buffer of the target divided by the packet size. The system of this example may also include a packet transmit module to transmit the P packets to the target, each of the packets including a sequence number and a portion of the patch, the transmission segmented into one or more cycles, the cycles including up to N packets. The system of this example may further include an acknowledgement (ACK) verification module to receive the ACKs from the target, the ACKs associated with one or more of the packet sequence numbers, the ACKS received asynchronously relative to the packet transmissions.

Example 2 may include the subject matter of Example 1, and the header generation module is further to transmit a first packet and wait to receive an ACK associated with the first packet, the first packet further including the packet size, an ACK algorithm type identifier and a patch checksum.

Example 3 may include the subject matter of Examples 1 and 2, and the ACK verification module is further to detect a transmission error associated with one of the P packets based on an error indication included in an ACK associated with the packet or based on a failure to receive an ACK associated with the packet.

Example 4 may include the subject matter of Examples 1-3, further including a retry module to retransmit the packet associated with the transmission error up to a predetermined number of attempts until receiving an ACK indicating transmission success.

Example 5 may include the subject matter of Examples 1-4, further including an algorithm selection module to select download operation in a single ACK mode, and the ACK is associated with one of the packet sequence numbers, or an aggregate ACK mode, and the ACK is associated with a plurality of the packet sequence numbers.

Example 6 may include the subject matter of Examples 1-5, and the selection of the download operating mode is based on measurement of download speed of one or more previous patch downloads.

Example 7 may include the subject matter of Examples 1-6, further to perform the download of a plurality of the patches from the host to a plurality of components of the target.

Example 8 may include the subject matter of Examples 1-7, and the packet size is further based on characteristics of the physical transport and is chosen to not exceed a threshold value.

Example 9 may include the subject matter of Examples 1-8, and the packet transmit module is further to select a data rate for the packet transmission based on a characteristic of the physical transport and a desired error rate.

Example 10 may include the subject matter of Examples 1-9, and the physical transport is a Universal Asynchronous Receiver/Transmitter (UART), a Serial Peripheral Interface (SPI), a Universal Serial Bus (USB) or an Inter-Integrated Circuit bus (I2C).

Example 11 may include the subject matter of Examples 1-10, including a first physical transport to transmit the packets and a second physical transport to receive the ACKs.

Example 12 may include the subject matter of Examples 1-11, including a plurality of physical transports to provide parallel transmission of the packets from the host to the target.

Example 13 may include the subject matter of Examples 1-12, and the packet transmit module is further to adjust the packet size based on transmission error rates and update N based on the adjusted packet size.

Example 14 may include the subject matter of Examples 1-13, and the packet transmit module is further to calculate a destination address for each of the packets, the destination address associated with a location within the buffer of the target.

According to Example 15 there is provided at least one computer-readable storage medium having instructions stored thereon which when executed by a processor result in the following operations for downloading a patch from a host to a target. The operations may include: determining a packet size based on a buffer capacity of the host; calculating a total number of packets (P) for transmission over a physical transport between the host and the target, P based on a size of the patch divided by the packet size; calculating a packet storage capacity (N) of the target, N based on a buffer capacity of the target divided by the packet size; transmitting the P packets to the target, each of the packets including a sequence number and a portion of the patch, the transmission segmented into one or more cycles, the cycles including up to N packets; and receiving acknowledgements (ACKs) from the target, the ACKs associated with one or more of the packet sequence numbers, the ACKS received asynchronously relative to the packet transmissions.

Example 16 may include the subject matter of Example 15, further including transmitting a first packet and waiting to receive an ACK associated with the first packet, the first packet further including the packet size, an ACK algorithm type identifier and a patch checksum.

Example 17 may include the subject matter of Examples 15 and 16, further including detecting a transmission error associated with one of the P packets based on an error indication included in an ACK associated with the packet or based on a failure to receive an ACK associated with the packet.

Example 18 may include the subject matter of Examples 15-17, further including retransmitting the packet associated with the transmission error up to a predetermined number of attempts until receiving an ACK indicating transmission success.

Example 19 may include the subject matter of Examples 15-18, further including selecting to operate in a single ACK mode, and the ACK is associated with one of the packet sequence numbers, or an aggregate ACK mode, and the ACK is associated with a plurality of the packet sequence numbers.

Example 20 may include the subject matter of Examples 15-19, and the selection of the operating mode is based on measurement of download speed of one or more previous patch downloads.

Example 21 may include the subject matter of Examples 15-20, further including performing the download of a plurality of the patches from the host to a plurality of components of the target.

Example 22 may include the subject matter of Examples 15-21, and the packet size is further based on characteristics of the physical transport and is chosen to not exceed a threshold value.

Example 23 may include the subject matter of Examples 15-22, further including selecting a data rate for the packet transmission based on a characteristic of the physical transport and a desired error rate.

According to Example 24 there is provided a method for downloading a patch from a host to a target. The method may include: determining a packet size based on a buffer capacity of the host; calculating a total number of packets (P) for transmission over a physical transport between the host and the target, P based on a size of the patch divided by the packet size; calculating a packet storage capacity (N) of the target, N based on a buffer capacity of the target divided by the packet size; transmitting the P packets to the target, each of the packets including a sequence number and a portion of the patch, the transmission segmented into one or more cycles, the cycles including up to N packets; and receiving acknowledgements (ACKs) from the target, the ACKs associated with one or more of the packet sequence numbers, the ACKS received asynchronously relative to the packet transmissions.

Example 25 may include the subject matter of Example 24, further including transmitting a first packet and waiting to receive an ACK associated with the first packet, the first packet further including the packet size, an ACK algorithm type identifier and a patch checksum.

Example 26 may include the subject matter of Examples 24 and 25, further including detecting a transmission error associated with one of the P packets based on an error indication included in an ACK associated with the packet or based on a failure to receive an ACK associated with the packet.

Example 27 may include the subject matter of Examples 24-26, further including retransmitting the packet associated with the transmission error up to a predetermined number of attempts until receiving an ACK indicating transmission success.

Example 28 may include the subject matter of Examples 24-27, further including selecting to operate in a single ACK mode, and the ACK is associated with one of the packet sequence numbers, or an aggregate ACK mode, and the ACK is associated with a plurality of the packet sequence numbers, and the selection of the operating mode is based on measurement of download speed of one or more previous patch downloads.

Example 29 may include the subject matter of Examples 24-28, further including performing the download of a plurality of the patches from the host to a plurality of components of the target.

Example 30 may include the subject matter of Examples 24-29, and the packet size is further based on characteristics of the physical transport and is chosen to not exceed a threshold value.

Example 31 may include the subject matter of Examples 24-30, further including selecting a data rate for the packet transmission based on a characteristic of the physical transport and a desired error rate.

According to Example 32 there is provided a system for downloading a patch from a host to a target. The system may include: means for determining a packet size based on a buffer capacity of the host; means for calculating a total number of packets (P) for transmission over a physical transport between the host and the target, P based on a size of the patch divided by the packet size; means for calculating a packet storage capacity (N) of the target, N based on a buffer capacity of the target divided by the packet size; means for transmitting the P packets to the target, each of the packets including a sequence number and a portion of the patch, the transmission segmented into one or more cycles, the cycles including up to N packets; and means for receiving acknowledgements (ACKs) from the target, the ACKs associated with one or more of the packet sequence numbers, the ACKS received asynchronously relative to the packet transmissions.

Example 33 may include the subject matter of Example 32, further including means for transmitting a first packet and waiting to receive an ACK associated with the first packet, the first packet further including the packet size, an ACK algorithm type identifier and a patch checksum.

Example 34 may include the subject matter of Examples 32 and 33, further including means for detecting a transmission error associated with one of the P packets based on an error indication included in an ACK associated with the packet or based on a failure to receive an ACK associated with the packet.

Example 35 may include the subject matter of Examples 32-34, further including means for retransmitting the packet associated with the transmission error up to a predetermined number of attempts until receiving an ACK indicating transmission success.

Example 36 may include the subject matter of Examples 32-35, further including means for selecting to operate in a single ACK mode, and the ACK is associated with one of the packet sequence numbers, or an aggregate ACK mode, and the ACK is associated with a plurality of the packet sequence numbers, and the selection of the operating mode is based on measurement of download speed of one or more previous patch downloads.

Example 37 may include the subject matter of Examples 32-36, further including means for performing the download of a plurality of the patches from the host to a plurality of components of the target.

Example 38 may include the subject matter of Examples 32-37, and the packet size is further based on characteristics of the physical transport and is chosen to not exceed a threshold value.

Example 39 may include the subject matter of Examples 32-38, further including means for selecting a data rate for the packet transmission based on a characteristic of the physical transport and a desired error rate.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for downloading a patch including at least one packet from a host to a target, the system comprising:
   host initialization circuitry to:
      determine a total number of packets (P) for transmission to the target based on a packet size of the at least one packet and a patch size of the patch; and
      determine a packet storage capacity (N) of the target based on the packet size and a capacity of a buffer of the target; and
   packet transmit circuitry to transmit the packets to the target, each of the packets including at least a sequence number and a portion of the patch, the transmission segmented into one or more cycles, each cycle including up to N packets.

2. The system of claim 1, wherein the host initialization circuitry is to determine the packet size based, at least in part, on a buffer capacity of the host.

3. The system of claim 1, wherein:
   the packets are to be transmitted to the target over a physical transport; and
   the host initialization circuitry is to determine the packet size of the at least one packet based, at least in part, on one or more characteristics of the physical transport.

4. The system of claim 1, further comprising acknowledgement (ACK) verification circuitry to receive ACKs from the target, wherein:
   the ACKs are associated with one or more of the packet sequence numbers; and
   the ACKs are received asynchronously relative to the packet transmissions.

5. The system of claim 4, wherein the initialization circuitry is further to transmit a first packet and wait to receive an ACK associated with the first packet, the first packet further including the packet size, an ACK algorithm type identifier and a patch checksum.

6. The system of claim 4, further comprising algorithm selection circuitry to select download operation in:
   a single ACK mode, wherein the ACK is associated with one of the packet sequence numbers; or
   an aggregate ACK mode, wherein the ACK is associated with a plurality of the packet sequence numbers.

7. The system of claim 4, wherein the ACK verification circuitry is further to detect a transmission error associated with one of the P packets based on:
   an error indication included in an ACK associated with the packet; or
   a failure to receive an ACK associated with the packet.

8. The system of claim 1, further comprising retry circuitry to retransmit the packet associated with the transmission error up to a predetermined number of attempts until receiving an ACK indicating transmission success.

9. One or more non-transitory computer-readable storage devices having stored thereon instructions which when executed by one or more processors result in operations for downloading a patch including one or more packets from a host to a target, the operations comprising:
   determine a total number of packets (P) for transmission to the target based on a packet size of the one or more packets and a patch size of the patch;
   determine a packet storage capacity (N) of the target based on the packet size and a capacity of a buffer of the target; and
   transmit the packets to the target, each of the packets including at least a sequence number and a portion of the patch, the transmission segmented into one or more cycles, each cycle including up to N packets.

10. The one or more non-transitory computer-readable storage devices of claim 9, wherein the instructions, when executed by the one or more processors, result in further operations comprising:
   determine the packet size based, at least in part, on a buffer capacity of the host.

11. The one or more non-transitory computer-readable storage devices of claim 9, wherein:
   the packets are to be transmitted to the target over a physical transport; and
   the instructions, when executed by the one or more processors, result in operations comprising:
      determine the packet size of the at least one packet based, at least in part, on one or more characteristics of the physical transport.

12. The one or more non-transitory computer-readable storage devices of claim 9, wherein the instructions, when executed by the one or more processors, result in further operations comprising:
   receive acknowledgements (ACKs) from the target, wherein:
      the ACKs are associated with one or more of the packet sequence numbers; and
      the ACKs are received asynchronously relative to the packet transmissions.

13. The one or more non-transitory computer-readable storage devices of claim 12, wherein the instructions, when executed by the one or more processors, result in further operations comprising:
   transmit a first packet and waiting to receive an ACK associated with the first packet, the first packet further including the packet size, an ACK algorithm type identifier and a patch checksum.

14. The one or more non-transitory computer-readable storage devices of claim 12, wherein the instructions, when executed by the one or more processors, result in further operations comprising:
   detect a transmission error associated with one of the P packets based on:
      an error indication included in an ACK associated with the packet; or
      a failure to receive an ACK associated with the packet.

15. A method for downloading a patch from a host to a target, the method comprising:
- determining a total number of packets (P) for transmission to the target based on a packet size of the one or more packets and a patch size of the patch;
- determining a packet storage capacity (N) of the target based on the packet size and a capacity of a buffer of the target; and
- transmitting the packets to the target, each of the packets including at least a sequence number and a portion of the patch, the transmission segmented into one or more cycles, each cycle including up to N packets.

16. The method of claim 15, further comprising determining the packet size based, at least in part, on a buffer capacity of the host.

17. The method of claim 15, further comprising determining the packet size of the at least one packet based, at least in part, on one or more characteristics of a physical transport, wherein the packets are to be transmitted to the target over the physical transport.

18. The method of claim 15, further comprising receiving acknowledgements (ACKs) from the target, wherein:
- the ACKs are associated with one or more of the packet sequence numbers; and
- the ACKs are received asynchronously relative to the packet transmissions.

19. The method of claim 18, further comprising transmitting a first packet and waiting to receive an ACK associated with the first packet, the first packet further including the packet size, an ACK algorithm type identifier and a patch checksum.

20. The method of claim 18, further comprising detecting a transmission error associated with one of the P packets based on:
- an error indication included in an ACK associated with the packet; or
- a failure to receive an ACK associated with the packet.

* * * * *